Nov. 3, 1931.   J. BERGE   1,830,460
FASTENER
Filed March 23, 1929
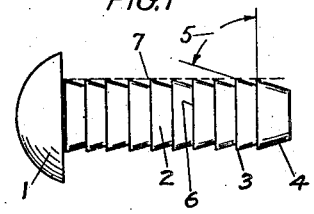
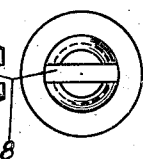
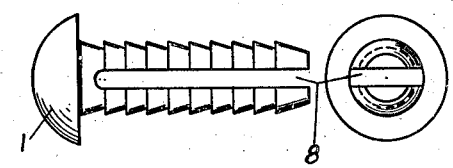
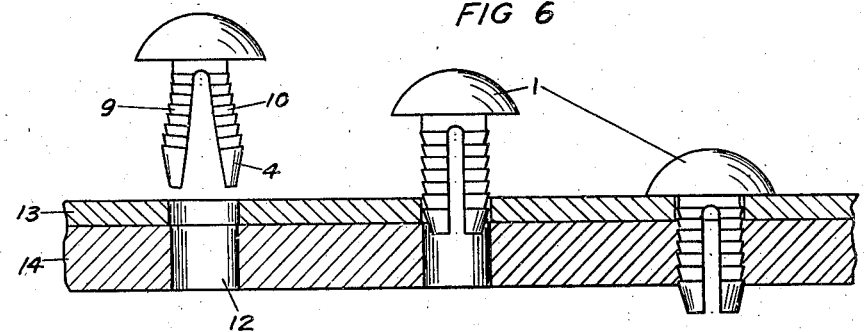
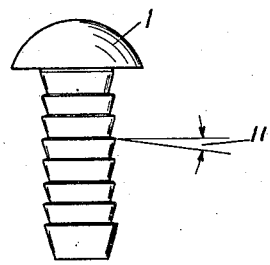
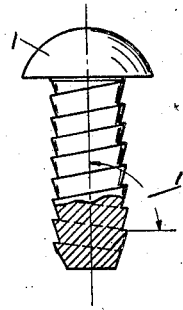
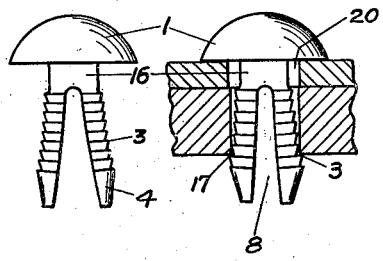
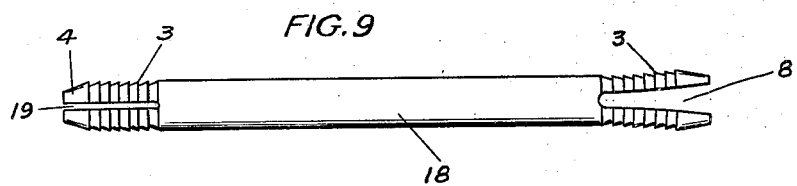
INVENTOR
JOSEPH BERGE
BY
A. D. T. Libby
ATTORNEY Patented Nov. 3, 1931

1,830,460

UNITED STATES PATENT OFFICE

JOSEPH BERGE, OF MONTCLAIR, NEW JERSEY

FASTENER

Application filed March 23, 1929. Serial No. 349,300.

This invention relates to a fastener especially adapted for use in the assembly of metallic or a combination of metallic and non-metallic parts, whereby the labor and expense of tapping is avoided, as well as the use of screw drivers and nuts.

One of the objects of my invention is to provide a fastener which can be quickly put into place by simply a blow or a series of blows from a hammer, but one which cannot be unscrewed or removed without much trouble.

Another object of my invention is to provide a fastener which eliminates the work of tapping out holes, the use of screw drivers, or the use of nuts and wrenches in the assembly process.

Another object of my invention is to provide a fastener that can be driven "home" or tight into a hole without turning it, for in turning, the surface that comes in contact with the head shoulder, is often damaged by the twist.

My invention is not to be confused with the so-called expansion bolt or with combinations of bolts and nuts which produce locking effects, or drive screws, as my invention is entirely different from any of these schemes or any other scheme of which I am aware.

My invention will be best understood by reference to the annexed drawings, wherein:

Figure 1 shows a plan view of one form of my invention.

Figure 2 is a view similar to Figure 1, but showing a modified form having a slotted stem.

Figure 3 is an end view of Figure 2.

Figure 4 is a plan view of another modified form.

Figure 5 is a plan view of still another modified form.

Figure 6 shows the device of Figure 2 in different positions of application.

Figure 7 shows a modified form in which the stem is relieved somewhat near the head.

Figure 8 is a view showing how the fastener is adapted to use in a hole considerably larger than the ordinary diameter of the fastener.

Figure 9 is a view showing how my invention may be applied to a stud type of fastener; that is to say, one in which there is no head, the same as shown in previous figures.

In the various views of the drawings, 1 illustrates the head of the fastener having a stem 2 which is provided with a plurality of barbs 3. Preferably, the end-barb 4 has the side forming the barb extended so as to produce a pilot for the purpose of expediting the use of the fastener. As shown in Figure 1, the barbs 3 are formed so that the angle 5 is approximately seventy degrees, the angle between the line 6 and the dotted line 7, which is parallel to the axis of the fastener, being a right angle, but not necessarily so, for while I have mentioned these specific figures, it is to be understood that these angles may be considerably different, as will be later pointed out.

For certain classes of work, a solid fastener is sometimes not desired, and preference is given to the form of device shown in Figures 2 and 3. In this form, the stem 2 is split or bifurcated as indicated by the slot 8 which extends transversely across the stem 2 for the greater part of its length, so that the two portions 9 and 10 of the stem may be split as shown in the left-hand portion of Figure 6.

In Figure 4, I have shown the barbs constructed in a somewhat different manner than previously indicated; that is to say, the angle 11 is something more than zero because of the fact that when the barb is formed the tool may leave a very small angle such as indicated. In practice I have found that by making the angle 11 in the neighborhood of five degrees, I get excellent gripping results from the barbs.

In Figure 5, the helical barb 3 is arranged in the form of one or more screw threads, except that the plane through the edge of the thread makes an angle 15 of substantially ninety degrees with the axis of the fastener. A spiral of little lead is preferred so the fastener will not turn when entering under pressure.

As will be seen by reference to Figure 6, the pilot 4 of the fastener is entered in the hole 12 in the pieces 13 and 14 which are desired to be held together, and the fastener is then driven by pressure applied to the head 1 into the piece shown at the right in Figure 6, and the barbs formed as has been described, dig into the material comprising the pieces held together and thereby act to prevent removal of the fastener.

In Figure 7, I have shown a fastener similar to that illustrated in Figure 6, but in which that part of the stem 16 adjacent the head 1 is of a slightly reduced diameter, which is desired in some cases.

In Figure 8, I have shown how my fastener permits wide and liberal tolerances in the size of the hole. For example, a ¼" fastener will hold in holes varying in diameter from less than ¼" to as much as $\frac{9}{32}$", the holding power varying inversely as the size of the hole. When the split end of the fastener enters the hole, the ends naturally spring together to obtain a parallel condition in which as many as possible of the barbs make an engagement with the wall of the hole; but where the hole is considerably larger than the normal diameter of the fastener, it may happen that only one barb engages, as illustrated by the numeral 17 in Figure 8, wherein the hole 20 is shown considerably larger than the fastener.

My invention is not limited to fasteners having heads thereon, but is also applicable to studs and shafts, as illustrated in Figure 9, wherein the stud or shaft 18 has both ends provided with barbs, one end, however, having a very narrow slot 19, while the other end has a wider slot 8, similar to that illustrated in the previous figures. It is to be understood that the stud may be used without the slot 19 if desired. In the use of the fastener in the form of a stud, the same may be driven into the hole by putting a pin or other implement in the slot 8 for use in forcing the stud into position in the hole, and then any other device may be attached to the end bearing the slot 8. It is to be understood of course, that the stud 18 may be made with the barbs only on one end.

In either of the forms described, the barbs should be hardened by any suitable process to a sufficient depth, so that the barbs will perform their function of digging or cutting into the material, thereby preventing the fasteners from being withdrawn or the parts held together by the fasteners from being pulled apart. For certain classes of work, hard bronze or chrome-plated fasteners may be used, but it is quite essential that the edges of the barbs be harder than the material into which the fasteners are driven for cooperation. It will be understood, however, that a soft steel, unhardened, is satisfactory when the material into which it is driven is softer; the hardening of the barbs also adds resilience to the limbs 9 and 10 of the stem. In the application of my fastener, any force may be used, such as the blow from a hammer, an arbor press, or the like.

The dimensions of the fastener itself of course vary according to the size required, and likewise the number of barbs vary according to the length and diameter of the fasteners which are adapted to be made in various sizes the same as screws.

Having thus described my invention, what I claim is:

1. A fastener comprising; a stem having a head for driving the fastener, said stem being bifurcated substantially its full length and having a series of spaced annular barbs throughout its length the biting edges of the barbs being in substantially the same plane as the flat upper surfaces of the barbs and in planes substantially at right angles to the axis of the fastener.

2. A fastener having a head and a stem divided to give spring tension, said stem part being of uniform cross-sectional area from end to end, said stem having a plurality of annular spaced barbs throughout its length, said barbs having the biting edges thereof in substantially the plane of the upper surfaces of the barbs and in a plane substantially at right angles to the axis of the fastener.

3. A fastener including a stem having at least one end divided to give outward spring tension, both ends of said stem having a series of annular spaced barbs the biting edges of which are in planes including the upper surface of the barbs and close to a right angle to the axis of the stem.

4. A fastener including a stem having one end at least bifurcated and a plurality of spaced annular barbs spaced along the entire bifurcated end the biting edges of which are in planes including the upper surface of the barbs and close to a right angle to the axis of the stem and of a diameter substantially the same throughout the length of the stem when in gripping position.

5. A fastener comprising; a stem having a head for driving the fastener, said stem being divided for substantially its full length and also being provided with a series of spaced barbs throughout its length, said barbs having their upper surfaces lying in planes transverse to the axis of the stem, and the barbs being hardened for the purpose described.

6. A fastener comprising; a stem having a head for the application of power, said stem being bifurcated substantially its full length and having a series of annular barbs throughout its length, said barbs each being similar to a truncated cone and arranged in inverted position with the truncated end of one cone engaging the base of the cone below it toward the end of the fastener, the periphery of the base of each cone being the biting edge of each barb, and these biting edges being hardened for the purpose described.

In testimony whereof, I affix my signature.

JOSEPH BERGE.